United States Patent
Besier et al.

(10) Patent No.: US 10,703,347 B2
(45) Date of Patent: Jul. 7, 2020

(54) METHOD FOR OPERATING A BRAKE SYSTEM OF A MOTOR VEHICLE, AND BRAKE SYSTEM

(71) Applicant: Continental Teves AG & Co. oHG, Frankfurt (DE)

(72) Inventors: Marco Besier, Bad Schwalbach (DE); Georg Roll, Frankfurt (DE); Sascha Gröger, Kelkheim (DE); Andreas Neu, Kuhardt (DE); Cristiano Hoffmann, Maintal (DE); Paul Linhoff, Neu-Anspach (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 16/072,949

(22) PCT Filed: Feb. 20, 2017

(86) PCT No.: PCT/EP2017/053736
§ 371 (c)(1),
(2) Date: Jul. 26, 2018

(87) PCT Pub. No.: WO2017/144390
PCT Pub. Date: Aug. 31, 2017

(65) Prior Publication Data
US 2019/0039583 A1 Feb. 7, 2019

(30) Foreign Application Priority Data

Feb. 26, 2016 (DE) .................... 10 2016 203 114
Jan. 19, 2017 (DE) .................... 10 2017 200 819

(51) Int. Cl.
*B60T 8/40* (2006.01)
*B60T 8/32* (2006.01)
(Continued)

(52) U.S. Cl.
CPC ............ *B60T 8/321* (2013.01); *B60T 8/4081* (2013.01); *B60T 8/4872* (2013.01); *B60T 17/18* (2013.01);
(Continued)

(58) Field of Classification Search
CPC ...... B60T 7/042; B60T 13/662; B60T 13/686; B60T 8/885; B60T 8/4081; B60T 13/745; B60T 8/4013; B60T 2270/413
See application file for complete search history.

(56) References Cited

U.S. PATENT DOCUMENTS 6,148,943 A * 11/2000 Kodaka ................... B60T 7/22
180/169
6,351,702 B1 * 2/2002 Tange ................ B60K 31/0008
180/170

(Continued)

FOREIGN PATENT DOCUMENTS

DE 102014212537 A1 * 12/2015 ............ B60T 8/4086
DE 102015212552 A1 1/2016
(Continued)

OTHER PUBLICATIONS

English translation of the Written Opinion for International Application No. PCT/EP2017/053736, dated Apr. 26, 2017, 5 pages.
(Continued)

*Primary Examiner* — Bradley T King
*Assistant Examiner* — Stephen M Bowes
(74) *Attorney, Agent, or Firm* — RatnerPrestia (57) ABSTRACT

A method for operating a brake installation of a vehicle. A first electrically controllable pressure provision device provides brake pressure for actuating hydraulically actuatable brakes. A first electronic open-loop and closed-loop control unit, and a first pressure detection device, measures brake pressure provided by a primary brake system. A secondary
(Continued)

brake system between the primary system and a part of the wheel brakes has a second electrically controllable pressure provision device provides brake pressure for actuating at least the part of the brakes. A second electronic open-loop and closed-loop control unit, and at least one second pressure detection device, the signals of which are processed in the second electronic open-loop and closed-loop control unit. The secondary system monitors the primary system based on signals from the second pressure detection device and on a predefined brake pressure demand to build up a brake pressure corresponding to the predefined brake pressure demand.

14 Claims, 3 Drawing Sheets (51) Int. Cl.
*B60T 8/48* (2006.01)
*B60T 17/18* (2006.01)

(52) U.S. Cl.
CPC ....... *B60T 8/4072* (2013.01); *B60T 2270/413* (2013.01); *B60Y 2400/81* (2013.01)

(56) References Cited

U.S. PATENT DOCUMENTS

| | | |
|---|---|---|
| 9,145,119 B2 | 9/2015 | Biller et al. |
| 9,205,824 B2 | 12/2015 | Feigel |
| 9,827,960 B2 | 11/2017 | Feigel et al. |
| 10,220,822 B2 | 3/2019 | Linhoff et al. |
| 2007/0152500 A1* | 7/2007 | Wakabayashi ............ B60T 7/22 303/155 |
| 2009/0045672 A1* | 2/2009 | Nishino .................. B60T 7/042 303/113.3 |
| 2012/0303234 A1* | 11/2012 | Matsuda ............... B60T 8/1706 701/71 |
| 2015/0151726 A1 | 6/2015 | McClain et al. |
| 2015/0274143 A1* | 10/2015 | Miyazaki ................ B60T 8/348 303/9.61 |
| 2016/0082937 A1* | 3/2016 | Nakaoka ................ B60T 8/885 303/15 |
| 2016/0214582 A1* | 7/2016 | Brenn ........................ B60T 7/12 |
| 2017/0129468 A1* | 5/2017 | Besier ................... B60T 8/4077 |
| 2017/0129469 A1 | 5/2017 | Besier et al. |

FOREIGN PATENT DOCUMENTS

| | | |
|---|---|---|
| KR | 20140023369 A1 | 2/2014 |
| WO | 2012143313 A1 | 10/2012 |
| WO | 2015074935 A1 | 5/2015 |
| WO | 2015106892 A1 | 7/2015 |
| WO | 2016012331 A1 | 1/2016 |

OTHER PUBLICATIONS

German Search Report for German Application No. 10 2017 200 819.9, dated Nov. 30, 2017, with partial translation—8 pages.
International Search Report and Written Opinion for International Application No. PCT/EP2017/053736, dated Apr. 26, 2017—8 pages.
Korean Grant of Patent for Korean Application No. 10-2018-7023791, dated Jan. 30, 2020, with translation, 3 pages.

* cited by examiner

METHOD FOR OPERATING A BRAKE SYSTEM OF A MOTOR VEHICLE, AND BRAKE SYSTEM

CROSS REFERENCE TO RELATED APPLICATIONS

This application is the U.S. National Phase Application of PCT International Application No. PCT/EP2017/053736, filed Feb. 20, 2017, which claims priority to German Patent Application No. 10 2016 203 114.7, filed Feb. 26, 2016 and German Patent Application No. 10 2017 200 819.9, filed Jan. 19, 2017, the contents of such applications being incorporated by reference herein.

FIELD OF THE INVENTION

The invention relates to a method for operating a brake installation and to a brake installation.

BACKGROUND OF THE INVENTION

DE 10 2015 212 552 A1, incorporated by reference herein, discloses a brake installation for a motor vehicle for actuating hydraulically actuatable wheel brakes of a front axle and of a rear axle, having a master brake system (primary brake system) having a master brake cylinder which can be actuated by means of a brake pedal, having a pressure medium reservoir tank assigned to the master brake cylinder, having an electrically controllable pressure modulation device for the purposes of setting wheel-specific brake pressures, which pressure modulation device has inlet and outlet valves, and having a first electrically controllable pressure provision device, and having a pump-valve module (secondary brake system), wherein the pump-valve module is connected hydraulically between the master brake system and the wheel brakes of front and rear axle. The master brake system performs the system pressure build-up at the wheel brakes in a normal braking operating mode, and the pump-valve module is provided for the situation in which the system pressure provision function of the master brake system has failed. In this situation, the pump-valve module performs the pressure build-up at the wheel brakes. DE 10 2015 212 552 A1 does not provide any more detailed disclosure regarding how a failure of the system pressure provision function of the master brake system is identified.

SUMMARY OF THE INVENTION

An aspect of the present invention is a method for operating a brake installation of a motor vehicle having a primary brake system and a downstream secondary brake system, and to provide a brake installation of said type, with which a failure of the primary brake system can be quickly and reliably identified, such that the secondary brake system can perform a braking function.

According to an aspect of the invention, "at least a part of the hydraulically actuatable wheel brakes" is to be understood to mean a subset of the hydraulically actuatable wheel brakes, for example two out of four wheel brakes, or else all hydraulically actuatable wheel brakes, for example four out of four wheel brakes. Correspondingly, "the part of the wheel brakes" may encompass a subset of wheel brakes or all wheel brakes.

An aspect of the invention is based on the concept that the secondary brake system monitors the primary brake system on the basis of the signals of the second pressure detection device of the secondary brake system and on the basis of a predefined brake pressure demand with regard to the functional capability of the primary brake system to build up a brake pressure corresponding to the predefined brake pressure demand. Worded slightly differently, this means that, in the second electronic open-loop and closed-loop control unit of the secondary brake system, monitoring of the primary brake system is performed with regard to the functional capability of the primary brake system to build up a brake pressure corresponding to a predefined brake pressure demand, wherein the monitoring is performed on the basis of the signals of the second pressure detection device and on the basis of the predefined brake pressure demand.

The monitoring of the primary brake system is performed by the secondary brake system, and on the basis of the signals of the second pressure detection device and the brake pressure demand, even if the primary brake system comprises a first pressure detection device that measures the brake pressure provided by the primary brake system. The signals of the first pressure detection device are processed in the first electronic open-loop and closed-loop control unit of the primary brake system. It would basically be possible for the primary brake system to be diagnosed, with regard to whether it can implement the brake pressure demand, by means of the first pressure detection device itself, and if necessary to transmit the self-identified malfunction to the secondary brake system. It would alternatively be conceivable for the signals of the first pressure detection device to additionally be supplied (in particular via separate signal lines) to the secondary brake system (in particular of the second electronic open-loop and closed-loop control unit), such that the monitoring of the primary brake system could be performed by the secondary brake system on the basis of the signals of the first pressure detection device. According to an aspect of the invention, however, the monitoring of the primary brake system is performed by the secondary brake system and on the basis of the signals of the second pressure detection device and the brake pressure demand.

An aspect of the invention permits reliable braking of the motor vehicle even in the event of failure of the primary brake system.

An aspect of the invention offers the advantage of increased reliability of the brake installation.

An aspect of the invention furthermore offers the advantage of an improved brake installation for automated driving.

The secondary brake system preferably monitors in particular the first pressure provision device of the primary brake system.

The first pressure detection device preferably measures the brake pressure provided by the first pressure provision device.

It is preferable if, for the monitoring of the primary brake system, the signals of the second pressure detection device are compared with the predefined brake pressure demand.

The brake pressure demand is preferably supplied or available to the first electronic open-loop and closed-loop control unit of the primary brake system and to the second electronic open-loop and closed-loop control unit of the secondary brake system. Thus, even in faultfree normal operation of the brake installation, the brake pressure demand to be implemented is available to both electronic open-loop and closed-loop control units, which is necessary in order to increase the operational reliability and availability of the brake installation, in particular for highly automated driving.

In one refinement of an aspect of the invention, the brake pressure demand is predefined by a control device. For brake installations for highly automated driving, this is preferably the control device with an autopilot function.

The control device is preferably connected to the second electronic open-loop and closed-loop control unit via a second signal connection and to the first electronic open-loop and closed-loop control unit via a first signal connection. The signal connection is particularly preferably in each case a data bus. Thus, the brake pressure demand to be implemented is available to both electronic open-loop and closed-loop control units.

In one refinement of an aspect of the invention, to the second electronic open-loop and closed-loop control unit of the secondary brake system, there is transmitted from the first electronic open-loop and closed-loop control unit of the primary brake system a signal regarding whether or not a brake pressure control function in the primary brake system is active. This can then be taken into consideration by the secondary brake system in the monitoring of the primary brake system, in particular in the comparison of the measured pressure value of the second pressure detection device with the predefined brake pressure demand. It is particularly preferable if, to the secondary brake system, there is transmitted information regarding whether or not a brake pressure control function, which permits an undershooting of the predefined brake pressure demand, in the primary brake system is active. In this case, it would be desired or intended that the pressure value measured by the second pressure detection device lies below the brake pressure demand. The pressure value measured by the second pressure detection device corresponds to an output pressure of the primary brake system, which in the case of a brake pressure control function may by all means be lower than the system brake pressure demanded for example by the driver or the autopilot function. It is very particularly preferable if, to the secondary brake system, there is transmitted information regarding whether or not an anti-lock control operation or a (drive) slip control operation or a driving dynamics control operation in the primary brake system is active.

It is preferable for an actuation of the part of the wheel brakes to be performed by means of the second pressure provision device of the secondary brake system if the primary brake system or the first pressure provision device, over a predefined time period, does not provide a brake pressure corresponding to the predefined brake pressure demand. Greater reliability is thus achieved. A fault counter is particularly preferably incremented for as long as the signals of the second pressure detection device do not correspond to the predefined brake pressure demand, and the secondary brake system performs the braking function of the brake installation, at least for the part of the wheel brakes, if the value of the fault counter exceeds a predefined threshold value.

The second pressure detection device preferably detects an inlet pressure of the secondary brake system. Since the secondary brake system is connected downstream of the primary brake system, an outlet pressure, in particular a wheel brake pressure, of the primary brake system is thus directly detected. If no brake pressure control function in the primary brake system is active, and the primary brake system is functionally capable, the measured pressure corresponds to the pressure provided by the first pressure provision device.

It is alternatively preferable for the second pressure detection device to detect an output pressure of the secondary brake system, particularly preferably a wheel brake pressure or pressure at one of the wheel brakes. Aside from any throttling effects of hydraulic components, for example a valve, in the hydraulic connection between inlet pressure port of the secondary brake system and outlet pressure port of the secondary brake system, the measured pressure corresponds to an outlet pressure of the primary brake system.

The secondary brake system may also comprise multiple second pressure detection devices, wherein one of these pressure detection devices detects an inlet pressure of the secondary brake system and another of these pressure detection devices detects an outlet pressure of the secondary brake system. The signals of one or more of the second pressure detection devices may then be taken into consideration for the monitoring.

An aspect of the invention also relates to a brake installation in which a method according to an aspect of the invention is carried out.

It is preferable if the hydraulic components of the primary brake system are designed as a first independent assembly, wherein the first assembly is assigned the first electronic open-loop and closed-loop control unit, and the hydraulic components of the secondary brake system are designed as a second independent assembly, wherein the second assembly is assigned the second electronic open-loop and closed-loop control unit. This permits the realization of subsystems which are easy to test and exchange. The first electronic open-loop and closed-loop control unit is particularly preferably arranged on the first assembly, and the second electronic open-loop and closed-loop control unit is particularly preferably arranged on the second assembly.

The primary brake system preferably comprises a master brake cylinder which is actuatable by means of a brake pedal and which is connected to hydraulically actuatable wheel brakes of a front axle and to hydraulically actuatable wheel brakes of a rear axle, wherein the first electrically controllable pressure provision device is connected to the wheel brakes of the front axle and to the wheel brakes of the rear axle.

The primary brake system preferably comprises a pressure medium reservoir tank which is assigned to the master brake cylinder and which is at atmospheric pressure.

The primary brake system preferably comprises an electrically controllable pressure modulation device, with at least one inlet valve, and in particular one outlet valve, for each wheel brake, for the purposes of setting wheel-specific brake pressures.

The secondary brake system preferably comprises a pump-valve arrangement which is arranged hydraulically between the primary brake system and the wheel brakes of the front axle.

The pump-valve arrangement is particularly preferably arranged hydraulically between the inlet valves of the wheel brakes of the front axle of the primary brake system and the wheel brakes of the front axle.

The pump-valve arrangement preferably comprises, for each wheel brake of the front axle, a first valve which is in particular designed to be open when electrically deenergized and which is in particular activatable in analog fashion and which is arranged between primary brake system and wheel brake.

The pump-valve arrangement preferably comprises, for each wheel brake of the front axle, a check valve which is connected in parallel with respect to the first valve and which opens in the direction of the wheel brake.

The pump-valve arrangement preferably comprises, for each wheel brake, an electrically activatable pump with a suction port and a pressure port, wherein the pressure port is connected, in particular directly, to the wheel brake. The pumps of the pump-valve arrangement thus constitute the second pressure provision device.

It is preferable if, for each pump, the suction port is connected via a third valve, which is in particular designed to be closed when electrically deenergized, to a pressure medium reservoir chamber of the pump-valve arrangement or to a pressure medium reservoir tank.

The pump-valve arrangement preferably comprises, for each wheel brake of the front axle, a second dissipation valve, which connects the wheel brake to the pressure medium reservoir chamber or to the pressure medium reservoir tank and which is in particular designed to be closed when electrically deenergized.

Each inlet pressure port of the pump-valve arrangement is preferably connected to an inlet valve of the pressure modulation device, and each output pressure port of the pump-valve arrangement is connected, in particular without the interposition of a valve, to one of the wheel brakes of the front axle.

The primary brake system or the first electrically controllable pressure provision device is preferably provided for the actuation of the hydraulically actuatable wheel brakes in a normal operating mode.

The secondary brake system or the second electrically controllable pressure provision device is designed for actuating at least a part of the hydraulically actuatable wheel brakes. It is particularly preferable for the secondary brake system or the second electrically controllable pressure provision device to be designed for actuating the wheel brakes of a front axle of the motor vehicle.

The secondary brake system or the second electrically controllable pressure provision device is preferably provided for actuating the part of the hydraulically actuatable wheel brakes in a second operating mode, in particular an electrically controlled fall-back operating mode.

It is particularly preferable for the first electronic open-loop and closed-loop control unit to serve for activating the first pressure provision device or the primary brake system.

It is preferable for the second electronic open-loop and closed-loop control unit to serve for activating the second pressure provision device or the secondary brake system.

BRIEF DESCRIPTION OF THE DRAWINGS

Further preferred embodiments of aspects of the invention will emerge from the claims and the following description with reference to figures.

In the figures, in each case schematically.

DETAILED DESCRIPTION OF THE PREFERRED EMBODIMENTS

Figure 1:
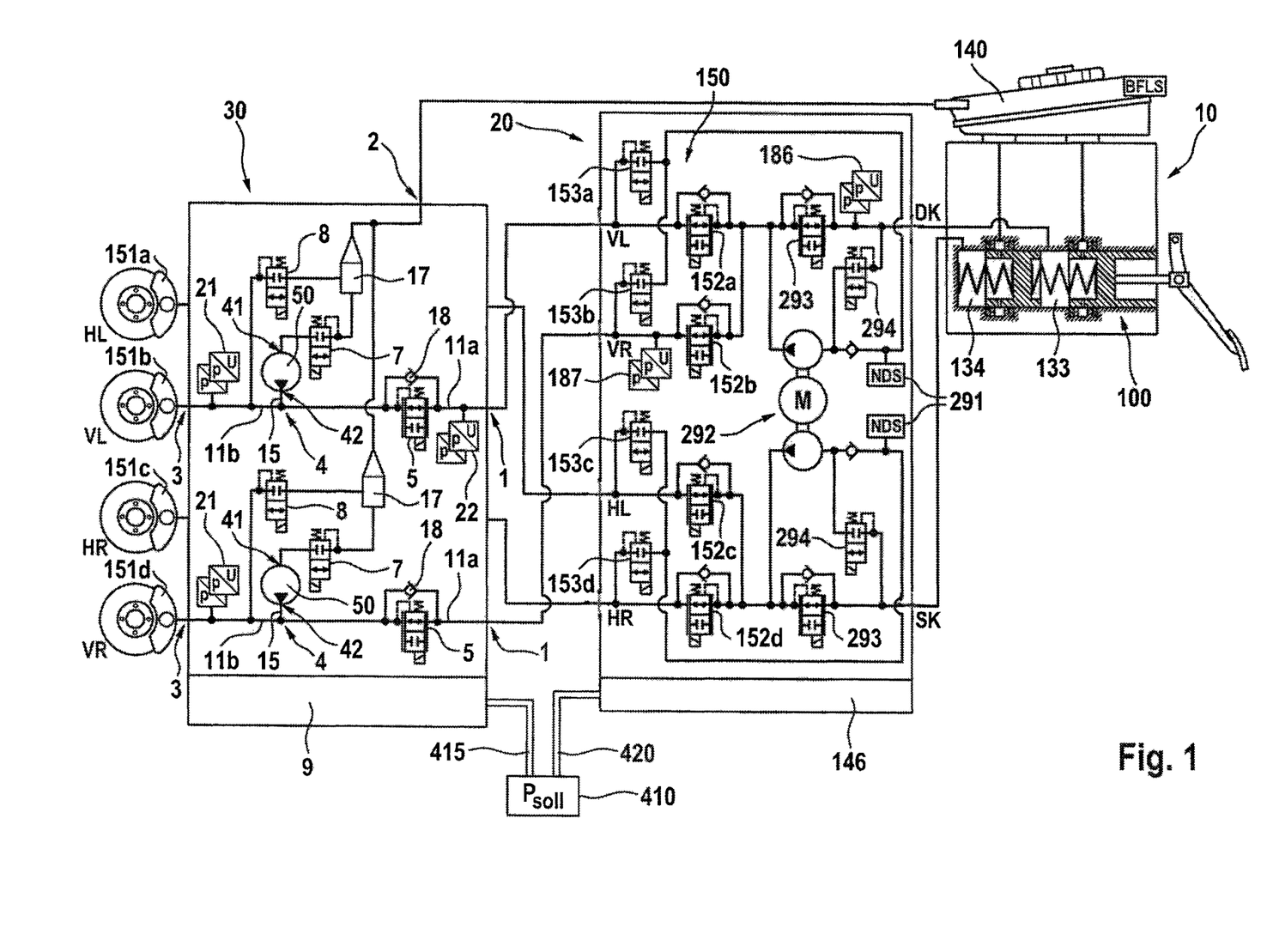
FIG. 1 shows a brake installation according to a first exemplary embodiment for carrying out a method according to an aspect of the invention.

FIG. 1 illustrates, in highly schematic form, a first exemplary brake installation of a motor vehicle for carrying out a method according to an aspect of the invention. The brake installation comprises a primary brake system for service braking operations 10, 20 (master brake system) and a secondary brake system for service braking operations 30 (designed in the example as an electrically controllable pump-valve arrangement or pump-valve module or backup module).

The primary brake system comprises substantially a brake actuation means 10 with master brake cylinder 100 and a conventional ESC module 20 with a first electrically controllable pressure provision device 292, which is assigned a first electronic open-loop and closed-loop control unit 146.

In the example, the brake actuation means 10 comprises a master brake cylinder 100, which can be actuated by means of a brake pedal and which has pressure spaces 133 and 134, wherein each pressure space 133 and 134 is assigned the wheel brakes of an axle 151b, 151d (front axle VA) and 151a, 151c (rear axle HA) respectively, and a pressure medium reservoir tank 140 which is assigned to the master brake cylinder and which is at atmospheric pressure. The wheel brake 151b is assigned to the left-hand front wheel VL, and the wheel brake 151d is assigned to the right-hand front wheel VR, and the wheel brakes 151b, 151d are assigned to the brake circuit I of the first master brake cylinder pressure space 133. The wheel brake 151a is assigned to the left-hand rear wheel HL, and the wheel brake 151c is assigned to the right-hand rear wheel HR, and the wheel brakes 151a, 151c are assigned to the brake circuit II of the second master brake cylinder pressure space 134.

ESC module 20 comprises a two-circuit motor-pump assembly 292, a low-pressure accumulator 291 and two electrically controllable valves 293, 294 for each brake circuit I, II, and also an electrically controllable pressure modulation device 150, with an inlet valve 152a-152d and with an outlet valve 153a-153d for each wheel brake for the purposes of setting wheel-specific brake pressures for the wheel brakes 151a-151d.

The secondary brake system or pump-valve arrangement 30 is assigned a second electronic open-loop and closed-loop control unit (ECU) 9.

Secondary brake system 30 is arranged hydraulically between the ESC module 20 and the wheel brakes 151b, 151d of the front axle. That is to say, secondary brake system or pump-valve arrangement 30 is arranged downstream of the corresponding inlet valves 152a, 152b of the front-wheel brakes 151b, 151d.

The wheel-specific outlet ports of the primary brake system are connected to the hydraulically actuatable wheel brakes 151a-151d of the front and rear axle, wherein the inlet valves 152c, 152d of the rear-wheel brakes are connected directly to the rear-wheel brakes 151a, 151c, and the inlet valves 152a, 152b of the front-wheel brakes are connected to the front-wheel brakes 151b, 151d via the secondary brake system 30.

The secondary brake system or the pump-valve arrangement 30 is, in the example, of two-circuit design. For each circuit, the secondary brake system comprises a first port 1 (inlet pressure port, pressure inlet) for connection to the primary brake system and a third port 3 (outlet pressure port, pressure outlet) for connection to the corresponding front-wheel brake 151b, 151d. Arrangement 30 comprises a (single) second port 2 (tank port) for connection to the pressure medium reservoir tank 140. For each circuit or each wheel brake the secondary brake system 30 comprises a pump 50 with a suction side 41 and with a pressure side 42.

The two-circuit secondary brake system 30 in the example thus comprises a second electrically controllable pressure provision device or pump arrangement 4 with two pumps 50, that is to say a single pump 50 for each circuit. The two pumps 50 of the pump arrangement 4 are driven jointly by one electric motor M. Each pump 50 comprises a suction side 41 and a pressure side 42. One of the circuits of the arrangement will be described below; the other circuit is of corresponding construction.

For each circuit, secondary brake system 30 comprises an electrically actuatable (first) valve 5 arranged between inlet pressure port 1 and outlet pressure port 3. In the example, valve 5 is designed to be open when electrically deenergized, and activatable in analog fashion.

The (first) valve 5 is arranged in a hydraulic connection 11 between the inlet pressure port 1 and the outlet pressure port 3 with a line section 11a (at the inlet pressure port side) and a line section 11b (at the outlet pressure port side). A check valve 18 which opens in the direction of the outlet pressure port 3 is connected in parallel with respect to the valve 5.

The pressure side 42 of the pump 50 is connected via a line section 15 to the associated line section 11b and thus to the associated outlet pressure port 3. Line section 11b is furthermore connected via a dissipation valve 8, which is closed when electrically deenergized, to a brake fluid reservoir chamber 17 which is arranged in the arrangement 30.

The suction side 41 of the pump 50 is connected to the brake fluid reservoir chamber 17 via a line section in which there is arranged a valve 7 which is closed when electrically deenergized.

Brake fluid reservoir chamber 17 is connected via a replenishment line to the second port 2 (tank port).

In the example, the replenishment lines of the brake fluid reservoir chambers 17 are connected together and are jointly connected to the tank port 2.

In the exemplary embodiment, the secondary brake system 30 comprises a (single) pressure detection device (pressure sensor) 22 which detects the pressure at one of the inlet pressure ports 1. The pressure at the inlet pressure port 1 of the brake circuit I is preferably detected.

In the exemplary embodiment, the secondary brake system 30 comprises, for each circuit or each wheel brake, a pressure detection device (pressure sensor) 21 which detects the pressure at the outlet pressure port 3, that is to say the respective wheel brake pressure.

The second electronic open-loop and closed-loop control unit 9 is designed for actuating the second pressure provision device or pump arrangement 4 and the valves 5, 7, 8. The signals of the pressure detection devices 22, 21 are supplied to the open-loop and closed-loop control unit 9.

The brake installation is connected to a control device 410 with an autopilot function, which control device, for the operation of the brake installation, determines a brake pressure demand Psoll, in the example a setpoint pressure. Control device 410 is connected to the second electronic open-loop and closed-loop control unit 9 via a signal connection 415, for example a data bus. Furthermore, control device 420 is connected to the first electronic open-loop and closed-loop control unit 146 via a signal connection 420, for example a data bus. The brake pressure demand Psoll is provided by the control device 410 via the signal connections 415, 420 to the electronic open-loop and closed-loop control units 9, 146 of the primary and secondary brake systems.

Figure 2:
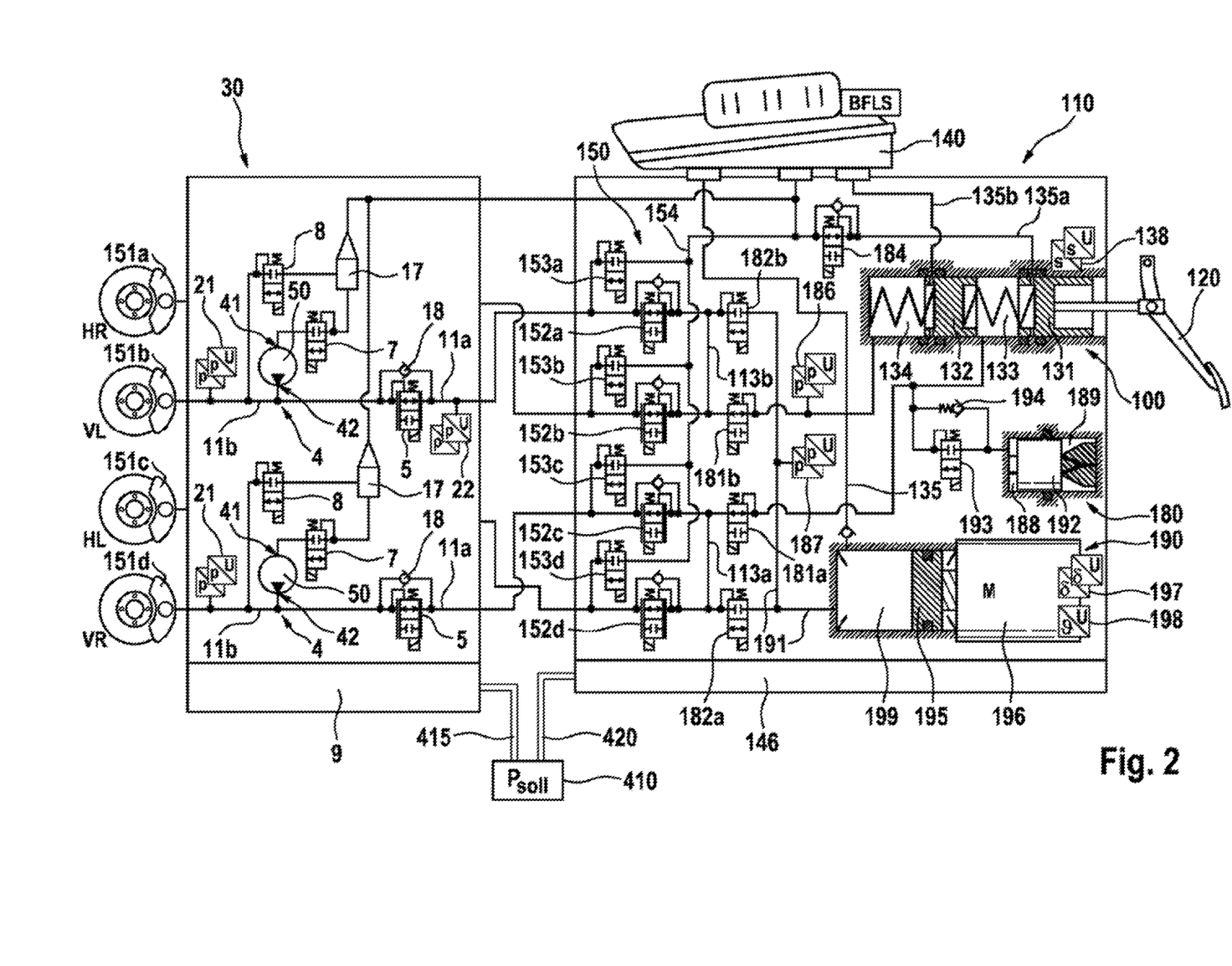
FIG. 2 shows a brake installation according to a second exemplary embodiment for carrying out a method according to an aspect of the invention.

FIG. 2 illustrates, in highly schematic form, a second exemplary brake installation of a motor vehicle for carrying out a method according to an aspect of the invention. The brake installation comprises a primary brake system for service braking operations 110 (master brake system) and a secondary brake system for service braking operations 30 (electrically controllable pump-valve arrangement), which secondary brake system is constructed similarly to the secondary brake system of FIG. 1.

Primary brake system 110 constitutes a simulator brake installation having substantially a master brake cylinder 100, which is directly actuatable by means of a brake pedal 120 via a pressure rod, having a pressure medium reservoir tank 140, which is assigned to the master brake cylinder 100 and which is at atmospheric pressure, having a (travel) simulation device 180, which interacts with the master brake cylinder 100, having a first electrically controllable pressure provision device 190, having an electrically controllable pressure modulation device 150 for setting wheel-specific brake pressures for the wheel brakes 151a-151d, and having a first electronic open-loop and closed-loop control unit (ECU) 146, which is designed for actuating the pressure provision device 190 and the pressure modulation device 150.

The two-circuit master brake cylinder 100 comprises two pistons 131, 132 arranged in series, which delimit two hydraulic pressure spaces 133, 134. The first piston 131 is mechanically coupled to the brake pedal and is actuated directly by the vehicle driver without the interposition of a brake booster. The pressure spaces 133, 134 are assigned pressure equalization lines 135a, 135b to the pressure medium reservoir tank 140. A normally open (NO) diagnostic valve 184 is contained in the pressure equalization line 135a.

To detect an actuation of the master brake cylinder 100, a travel sensor 138, which is advantageously of redundant design, is provided, which travel sensor detects for example a displacement of the piston 131 and/or 132.

Pressure sensor 186 detects the pressure built up in the pressure space 134 as a result of a displacement of the second piston 132.

Pressure modulation device 150 comprises wheel-specific inlet valves 152a-152d and outlet valves 153a-153d. The inlet ports of the inlet valves 152a-152d are supplied, via brake circuit supply lines 113a, 113b, with pressures which, in a first operating mode (for example "brake-by-wire"), are derived from a system pressure present in a system pressure line 191 connected to the first pressure provision device 190. The hydraulic connection between the system pressure line 191 and the brake circuit supply line 113a, 113b can be shut off by means of a sequence valve 182a, 182b, which is advantageously designed to be closed when electrically deenergized, for each brake circuit. In a second operating mode (hydraulic fall-back operating mode), the brake circuit supply lines 113a, 113b are connected to the associated master brake cylinder pressure space 133, 134 by means of an isolating valve 181a, 181b, which is advantageously open when electrically deenergized, for each brake circuit. The outlet ports of the outlet valves 153a-153d are connected to the pressure medium reservoir tank 140 via a common return line 154.

In the example, the wheel brakes 151c and 151d are assigned to the left-hand rear wheel HL and to the right-hand front wheel VR and to the brake circuit supply line 113a, and the wheel brakes 151a and 151b are assigned to the right-hand rear wheel HR and to the left-hand front wheel VL and to the brake circuit supply line 113a. Other brake circuit distributions are conceivable.

Simulation device 180 is hydraulically couplable to the master brake cylinder 100 and is composed substantially of a simulator chamber 188, a simulator spring chamber 189 and a simulator piston 192 which separates the two chambers from one another. Simulator piston 192 is supported on the housing by an elastic element (e.g. a spring), which is arranged in the simulator spring chamber 188 and which is advantageously preloaded. The simulator chamber 188 can be connected to the pressure space 133 of the master brake cylinder 100 by means of an electrically actuatable simulator enable valve 193. When a pedal force is input and simulator enable valve 193 is activated, pressure medium flows from master brake cylinder pressure space 133 into the simulator chamber 188. A check valve 194 arranged hydraulically antiparallel with respect to the simulator enable valve 193 allows the pressure medium to flow back from the simulator chamber 188 to master brake cylinder pressure chamber 133 substantially unhindered, irrespective of the switching state of the simulator enable valve 193.

The electrically controllable pressure provision device 190 is designed as a hydraulic cylinder-piston arrangement or a single-circuit electrohydraulic actuator, the piston 195 of which can be actuated by a schematically indicated electric motor 196 via a likewise schematically illustrated rotation/translation mechanism. A merely schematically indicated rotor position sensor which serves to detect the rotor position of the electric motor 196 is denoted by the reference designation 197. In addition, use may also be made of a temperature sensor 198 for detecting the temperature of the motor winding. The piston 195 delimits a pressure space 199, which is connected to the system pressure line 191. Additional pressure medium can be drawn into the pressure space 199 by retraction of the piston 195 while the sequence valves 182a, 182b are closed, by virtue of the fact that pressure medium can flow out of the tank 140 into the actuator pressure space 199 via a replenishment line 135 which has a check valve (not designated in any more detail) which opens in a flow direction to the actuator 190.

To detect the pressure provided by the first pressure provision device 190 and prevailing in the system pressure line 191, a pressure sensor 187 of preferably redundant design is provided.

In this case, too, the secondary brake system 30 is arranged hydraulically between the primary brake system 110, more specifically the pressure modulation device 150, and the wheel brakes of the front axle, that is to say the wheel brake 151b of the left-hand front wheel VL and the wheel brake 151d of the right-hand front wheel VR. That is to say, secondary brake system 30 is arranged downstream of the corresponding inlet valves 152a, 152c.

The wheel-specific outlet ports of the primary brake system 110 are connected to the hydraulically actuatable wheel brakes 151a-151d of the front and rear axle, wherein the inlet valves 152b, 152d of the rear-wheel brakes are connected directly to the rear-wheel brakes 151a, 151c, and the inlet valves 152a, 152c of the front-wheel brakes are connected to the front-wheel brakes 151b, 151d via the secondary brake system 30.

The hydraulic components of the brake installation are, in the example, arranged in two hydraulic units (modules). Each hydraulic unit is assigned an electronic open-loop and closed-loop control unit 146, 9.

As in the first exemplary embodiment of FIG. 1, the brake installation is connected to a control device 410 with an autopilot function, which control device determines a brake pressure demand Psoll and is connected to the first and the second electronic open-loop and closed-loop control unit 416, 9, as in the first exemplary embodiment.

In the first and in the second exemplary embodiment, each of the electronic open-loop and closed-loop control units 146, 9 is preferably supplied from a dedicated electrical energy supply (not illustrated).

The secondary brake system 30 in the example may be connected downstream of any desired hydraulic (master) brake system. For example, it may, as illustrated in FIG. 1, be connected downstream of a conventional brake system comprising an actuation means 10 and a standard ESC 20. Furthermore, it may, as illustrated by way of example in FIG. 2, be connected downstream of a simulator brake system 110.

In the case of electrically boosted brake systems, it must be ensured that adequate availability is provided. High availability is preferably achieved by virtue of the brake installation being supplied from at least two mutually independent electrical energy sources. Furthermore, the components that are put at risk by possible failures, such as electronic open-loop and closed-loop control units (ECU) and actuators (in particular electrically controllable pressure provision devices), are preferably of redundant design.

An exemplary method for operating the exemplary brake installations of FIGS. 1 and 2 will be described below.

It is preferable if primary brake system 10, 20; 110 performs the build-up of system pressure in a normal braking operating mode, and the secondary brake system 30 is provided for the situation in which the system pressure provision function of the primary brake system 10, 20; 110 has failed. In this situation, the secondary brake system performs the build-up of pressure.

The secondary brake system may both hydraulically boost a driver-imparted braking action and build up a driver-independent pressure.

The secondary brake system (for example pump-valve module) 30 is used in addition to the primary brake system 10, 20; 110, which already has an electrically actuatable pressure generator 292, 190. The secondary brake system 30 comprises the second electronic open-loop and closed-loop control unit (ECU) 9, which is required for redundancy, and a second pressure generator 4, such that, in the brake installation as a whole, two independent ECUs and pressure generators are provided.

In order, in the event of a failure of the "regular" primary brake system 10, 20; 110, to transfer the braking function to the secondary brake system 30, several possibilities are conceivable.

One possibility would be for the primary brake system to itself diagnose a fault and thus itself identify that it is no longer capable of implementing the brake pressure demand. This self-identified malfunction may then be transmitted by bus communication or the like to the electronic open-loop and closed-loop control unit of the secondary brake system. Correspondingly, the brake pressure demand can then be implemented by the secondary brake system.

A further possibility would be a failure of the primary brake system such that it is completely electrically deenergized, or such that functioning and bus communication are no longer possible. This state would be identified by monitoring of the bus communication by the secondary brake system, and the secondary brake system could likewise take over the braking function. Such bus communication monitoring, and reactions thereto if appropriate, are known per se. It would be advantageous here for the communication connection to be of redundant design, because then a failure of one of the communication connections could be distinguished from a failure of the primary brake system.

According to an aspect of the invention, the secondary brake system 30 monitors the primary brake system 10, 20; 110 on the basis of the signals of the pressure detection device 22 or 21 of the secondary brake system 30 and on the basis of the predefined brake oressure demand Psoll with regard to the functional capability of the primary brake system to build up a brake pressure corresponding to the predefined brake pressure demand. For example, pressure monitoring in the secondary brake system 30 is performed, which pressure monitoring detects and observes the brake pressure by means of the one or more pressure sensors 22 or 21 provided in the secondary brake system 30. Since the secondary brake system 30 is connected downstream of the primary brake system 10, 20; 110, said secondary brake system can for example detect one of the generated brake pressures in the front-wheel brake circuits of the primary brake system 10, 20; 110 and compare it with the brake pressure demand Psoll, and thus monitor the primary brake system.

As supplementary information, it is advantageous for information regarding whether an anti-lock control operation (ABS control) is presently active to be provided from the primary brake system 10, 20; 110 to the secondary brake system 30, because here, an undershooting of the demanded brake pressure could be desired.

If no ABS control operation of the primary brake system 10, 20; 110 is active, the secondary brake system 30 monitors for example the set wheel circuit pressure of the primary brake system. For this purpose, the secondary brake system can compare the measurement values from the dedicated pressure sensors 22, 21 with the demanded brake pressure demand Psoll. The brake pressure demand Psoll is known to both brake systems even in normal operation, and thus the secondary brake system can continuously compare the present brake pressure demand Psoll with the detected pressure or the detected pressures and thus monitor whether the primary brake system is adequately converting the brake pressure demand Psoll into the corresponding brake pressure.

Thus, even unidentified malfunctions of the primary brake system 10, 20; 110 can be identified by the secondary brake system 30. The secondary brake system 30 can, if necessary, independently perform the braking function and implement the present brake pressure demand Psoll by means of its pressure provision device 4.

Greater reliability is thus achieved by means of the method according to an aspect of the invention. Thus, a brake installation of said type or an operating method of said type is extremely highly suited to automated driving.

Figure 3:
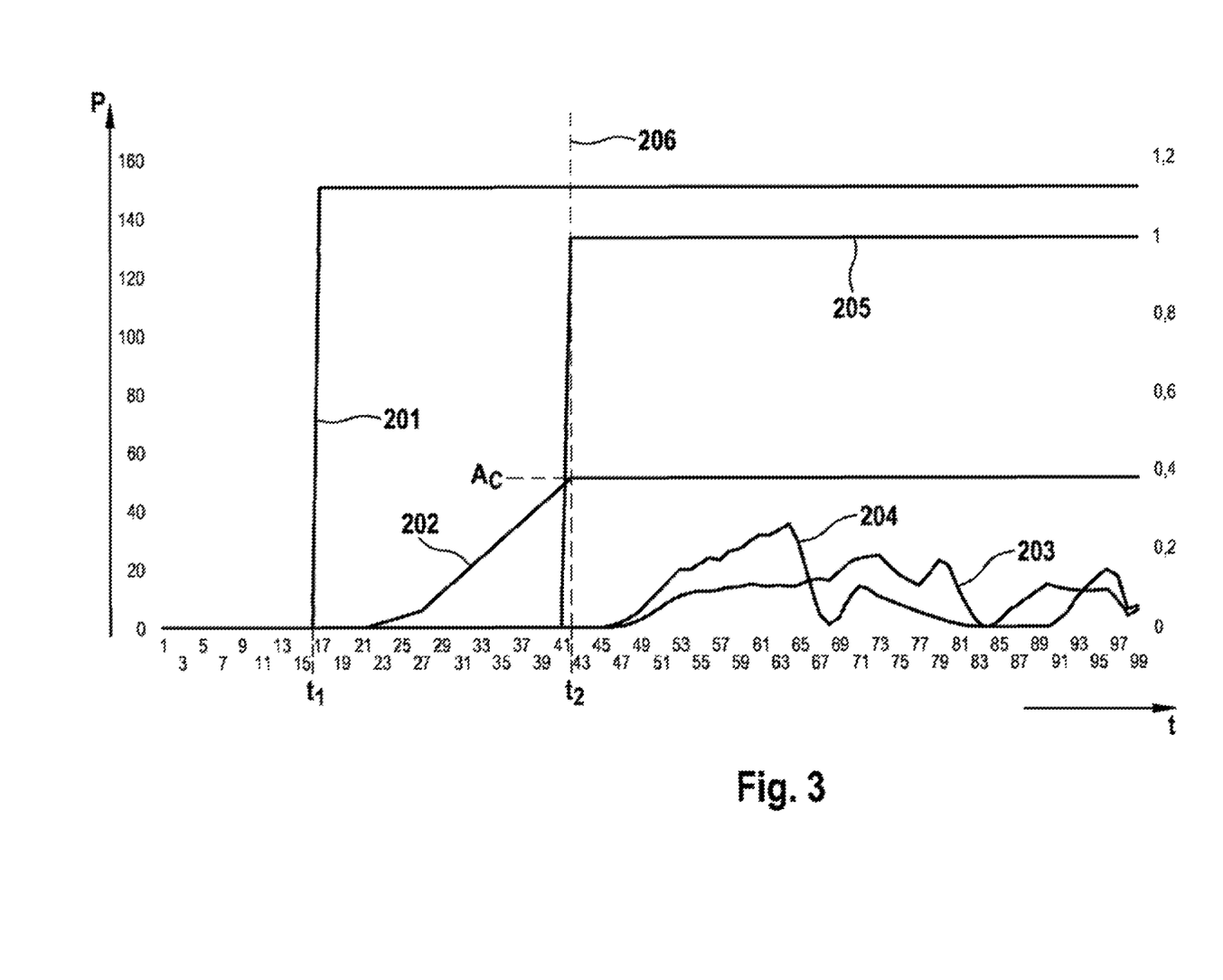
FIG. 3 shows profiles with respect to time of different variables during an exemplary method.

For illustrative purposes, FIG. 3 illustrates profiles with respect to time of different variables during an exemplary method. The figure shows an exemplary measurement trace. As a function of the time t, line 201 illustrates the brake pressure demand Psoll, line 202 illustrates the counter value C of a fault counter, line 203 illustrates the wheel brake pressure of the left-hand front-wheel brake 151b, line 204 illustrates the wheel brake pressure of the right-hand front-wheel brake 151d, and line 205 illustrates a flag for the takeover by the secondary brake system.

At the time $t_1$, the brake pressure demand 201 jumps to a high value, but the primary brake system, owing to a malfunction, does not build up a wheel brake pressure, which is evident from the fact that the wheel brake pressures 203, 204 do not increase. This is identified by the secondary brake system on the basis of the monitoring of the primary brake system. If the signals of the pressure detection device of the secondary brake system do not correspond to the brake pressure demand Psoll, the fault counter (line 202) is incremented in loopwise fashion. If, at the time $t_2$, the counter value C of the fault counter has reached a threshold value $A_C$ (the time $t_2$ is marked by the vertical dashed line 206), the secondary brake system decides to take over the braking function and to implement the brake pressure demand Psoll by means of the secondary brake system. Subsequently, the desired brake pressure is built up by the secondary brake system, as can be seen on the basis of the increasing wheel brake pressures 203, 204. Up to the time $t_2$, the primary brake system is active, and thereafter the secondary brake system is active.

An advantage of an aspect of the invention is that, by means of the described monitoring, even otherwise unidentified faults are identified or covered by the secondary brake system. By means of the described monitoring, greater reliability can be achieved, because all malfunctions that result in a brake pressure demand not being implemented as desired by the primary brake system are independently identified and compensated by the secondary brake system.

The invention claimed is:

1. A method for operating a brake installation of a motor vehicle including:
   a primary brake system comprising:
   a first electrically controllable pressure provision device for providing a brake pressure for actuating hydraulically actuatable wheel brakes,
   a first electronic open-loop and closed-loop control unit, and
   a first pressure detection device, which measures a brake pressure provided by the primary brake system, and
   a secondary brake system comprising:
   a second electrically controllable pressure provision device for providing a brake pressure for actuating at least a part of the hydraulically actuatable wheel brakes,
   a second electronic open-loop and closed-loop control unit, and
   at least one second pressure detection device, the signals of which are processed in the second electronic open-loop and closed-loop control unit,
   wherein the secondary brake system is arranged hydraulically between the primary brake system and the part of the wheel brakes,
   the method comprising:
   detecting a pressure with the at least one second pressure detection device;
   transmitting from the first electronic open-loop and closed-loop control unit of the primary brake system, to the second electronic open-loop and closed-loop control unit of the secondary brake system, a signal regarding whether or not a brake pressure control function in the primary brake system is active; and
   monitoring, with the secondary brake system, the primary brake system on the basis of (i) the signals of the second pressure detection device generated based on the detected pressure; (ii) the predefined brake pressure demand; and (iii) the signal regarding whether or not the brake pressure control function in the primary brake system is active, in order to determine a functional capability of the primary brake system to build up a brake pressure corresponding to the predefined brake pressure demand.

2. The method as claimed in claim 1, wherein, for the monitoring, the signals of the second pressure detection device are compared with the predefined brake pressure demand.

3. The method as claimed in claim 1, wherein the brake pressure demand is supplied or available to the first electronic open-loop and closed-loop control unit of the primary brake system and to the second electronic open-loop and closed-loop control unit of the secondary brake system.

4. The method as claimed in claim 1, wherein the brake pressure demand is predefined by a control device.

5. The method as claimed in claim 4, wherein the control device is connected to the first electronic open-loop and closed-loop control unit via a first signal connection, and the control device is connected to the second electronic open-loop and closed-loop control unit via a second signal connection.

6. The method as claimed in claim 4, wherein the control device is connected to the first electronic open-loop and closed-loop control unit via a first data bus, and the control device is connected to the second electronic open-loop and closed-loop control unit via a second data bus.

7. The method as claimed in claim 1, wherein the brake pressure control function is a function which permits an undershooting of the predefined brake pressure demand.

8. The method as claimed in claim 1, wherein an actuation of the part of the wheel brakes is performed by the second pressure provision device of the secondary brake system if the primary brake system, over a predefined time period, does not provide a brake pressure corresponding to the predefined brake pressure demand.

9. The method as claimed in claim 1, wherein the second pressure detection device detects an inlet pressure of the secondary brake system.

10. The method as claimed in claim 1, wherein the second pressure detection device detects an outlet pressure of the secondary brake system.

11. The method as claimed in claim 1, wherein the brake pressure demand is predefined by an autopilot function.

12. The method as claimed in claim 1, wherein the second pressure detection device detects a wheel brake pressure of the secondary brake system.

13. A brake installation for a motor vehicle comprising:
a primary brake system comprising:
a first electrically controllable pressure provision device for providing a brake pressure for actuating hydraulically actuatable wheel brakes,
a first electronic open-loop and closed-loop control unit, and
a first pressure detection device, which measures a brake pressure provided by the primary brake system, and
a secondary brake system comprising:
a second electrically controllable pressure provision device (4) for providing a brake pressure for actuating at least a part of the hydraulically actuatable wheel brakes,
a second electronic open-loop and closed-loop control unit, and
at least one second pressure detection device, the signals of which are processed in the second electronic open-loop and closed-loop control unit,
wherein the secondary brake system is arranged hydraulically between the primary brake system and the part of the wheel brakes,
wherein the first electronic open-loop and closed-loop control unit is configured to transmit a signal regarding whether or not a brake pressure control function in the primary brake system is active to the second electronic open-loop and closed-loop control unit,
wherein the second electronic open-loop and closed-loop control unit is configured to monitor, on the basis of (i) the signals of the second pressure detection device generated based on detected pressure; (ii) a predefined brake pressure demand; and (iii) the signal regarding whether or not the brake pressure control function in the primary brake system is active, in order to determine a functional capability of the primary brake system to build up a brake pressure corresponding to a predefined brake pressure demand.

14. A brake installation for a motor vehicle comprising:
a primary brake system comprising:
a first electrically controllable pressure provision device for providing a brake pressure for actuating hydraulically actuatable wheel brakes,
a first electronic open-loop and closed-loop control unit, and
a first pressure detection device, which measures a brake pressure provided by the primary brake system; and
a secondary brake system comprising:
a second electrically controllable pressure provision device for providing a brake pressure for actuating at least a part of the hydraulically actuatable wheel brakes),
a second electronic open-loop and closed-loop control unit, and
at least one second pressure detection device, the signals of which are processed in the second electronic open-loop and closed-loop control unit,
wherein the secondary brake system is arranged hydraulically between the primary brake system and the part of the wheel brakes,
wherein the first electronic open-loop and closed-loop control unit is configured to transmit a signal regarding whether or not a brake pressure control function in the primary brake system is active to the second electronic open-loop and closed-loop control unit,
wherein the second electronic open-loop and closed-loop control unit is configured to monitor, on the basis of (i) the signals of the second pressure detection device generated based on detected pressure; (ii) a predefined brake pressure demand; and (iii) the signal regarding whether or not the brake pressure control function in the primary brake system is active, in order to determine a functional capability of the primary brake system to build up a brake pressure corresponding to a predefined brake pressure demand, and
wherein for the monitoring, the second electronic open-loop and closed-loop control unit compares the signals of the second pressure detection device with the predefined brake pressure demand.

* * * * *